US012762741B2

(12) United States Patent
Omlor et al.

(10) Patent No.: US 12,762,741 B2
(45) Date of Patent: Oct. 13, 2026

(54) METHOD FOR OPERATING AN IMAGE RECORDING SYSTEM, IMAGE RECORDING SYSTEM, AND COMPUTER PROGRAM

(71) Applicant: Carl Zeiss AG, Oberkochen (DE)

(72) Inventors: Lars Omlor, Oberkochen (DE); Benjamin Voelker, Oberkochen (DE)

(73) Assignee: Carl Zeiss AG, Oberkochen (DE)

(*) Notice: Subject to any disclaimer, the term of this patent is extended or adjusted under 35 U.S.C. 154(b) by 200 days.

(21) Appl. No.: 18/521,321

(22) Filed: Nov. 28, 2023

(65) Prior Publication Data

US 2024/0177346 A1 May 30, 2024

(30) Foreign Application Priority Data

Nov. 28, 2022 (DE) ..................... 10 2022 212 679.3

(51) Int. Cl.
*G06T 7/80* (2017.01)
*G06T 5/90* (2024.01)

(52) U.S. Cl.
CPC .................. *G06T 7/80* (2017.01); *G06T 5/90* (2024.01); *G06T 2207/20081* (2013.01); *G06T 2207/20221* (2013.01)

(58) Field of Classification Search
CPC ... G06T 7/80; G06T 5/90; G06T 2207/20081; G06T 2207/20221; G06T 5/94; G06T 7/90; G06T 11/40; G06T 11/60; H04N 5/2621; H04N 23/617; H04N 5/265; H04N 23/55; H04N 23/73; H04N 23/741
See application file for complete search history.

(56) References Cited

U.S. PATENT DOCUMENTS

| | | | | |
|---|---|---|---|---|
| 2016/0364841 | A1* | 12/2016 | Douady-Pleven | H04N 9/646 |
| 2018/0089874 | A1* | 3/2018 | Wu | G06T 11/60 |
| 2018/0211440 | A1* | 7/2018 | Kunkel | G09G 3/00 |
| 2022/0005169 | A1 | 1/2022 | Park et al. | |
| 2022/0247906 | A1* | 8/2022 | Koerner | G02B 27/0012 |
| 2022/0353401 | A1* | 11/2022 | Do | H04N 9/646 |
| 2022/0375045 | A1 | 11/2022 | Wu et al. | |
| 2023/0030689 | A1* | 2/2023 | Gardiner | G06T 7/0002 |

FOREIGN PATENT DOCUMENTS

| | | |
|---|---|---|
| CN | 114758054 A | 7/2022 |

OTHER PUBLICATIONS

Office Action issued in German Patent Application No. DE 10 2022 212 679.3, dated Jul. 24, 2023 (from which this application claims priority) and English language translation thereof.

* cited by examiner

*Primary Examiner* — Chan S Park
*Assistant Examiner* — Daniel C Chang
(74) *Attorney, Agent, or Firm* — Ewers IP Law PLLC; Falk Ewers

(57) ABSTRACT

A method for operating a mobile terminal including an image recording device includes capturing at least one recording of a scene and checking at least one of optionally several recordings checked for the presence of a light source. Subsequently, a position of the light source is determined relative to an optical center and a shape, an intensity and/or a color is determined for the light source. An algorithm trained in relation to imaging properties of a given optical unit is then used to generate a flare image of a lens flare for this light source and the given optical unit using the position of the light source. The flare image is subsequently combined with the recording to form a combination image and the combination image is stored in a memory component.

14 Claims, 3 Drawing Sheets

METHOD FOR OPERATING AN IMAGE RECORDING SYSTEM, IMAGE RECORDING SYSTEM, AND COMPUTER PROGRAM

CROSS REFERENCE TO RELATED APPLICATIONS

This application claims priority to German patent application DE 10 2022 212 679.3, filed Nov. 28, 2022, the entire content of which is incorporated herein by reference.

TECHNICAL FIELD

The disclosure relates to a method for operating an image recording system with a mobile terminal including an image recording device. The disclosure also relates to an image recording system including a mobile terminal configured to perform the aforementioned method. Additionally, the disclosure relates to a computer program product.

BACKGROUND

Image recording devices usually form photographic and/or cinematographic systems, usually referred to as cameras, for capturing individual images or video frame sequences. Such a system usually includes an imaging sensor and an assigned optical unit, usually referred to as a lens. The latter regularly includes a lens element system formed from a plurality of optical lens elements—i.e., lens elements for imaging light in the visible spectral range (i.e., between 380 and 780 nanometers wavelength in particular). In principle, however, mirror optical units or combinations of mirrors and lens elements are also possible and known. The image sensor serves for the optoelectronic conversion of the image imaged on the image sensor with the optical unit into an electronic signal.

An object when designing and producing (camera) optical units, which is to say lenses, and the lens element systems thereof is always to produce an image representation with as few imaging aberrations as possible. In this context, imaging aberrations inter alia include longitudinal and transverse chromatic aberrations which inter alia lead to undesirable color fringes in the recording, spherical aberrations, so-called distortions which lead to barrel-type or pincushion-type distortions of straight lines, and the like. However, reflections at the lens element faces across the light-ray direction also lead to imaging aberrations which inter alia are called “lens flares” or “ghosts”. Such lens flares are usually caused by comparatively strong light sources and frequently perceived as bothersome as they are regularly accompanied by a loss of information (in particular by covering scene elements to be displayed). It is another object to ensure that the transmission through the entire optical unit, which is to say through the lens element system in particular, is as high as possible so as to keep light losses in the image representation as low as possible. As a result, what is known as the “light intensity” of the relevant lens is likewise kept high such that recordings can be taken even if the exposure is comparatively poor or in the case of light conditions with low illumination values, for example at night, in spaces without additional illumination and the like.

In order to obtain transmission values that are as high as possible, but also to reduce the aforementioned lens flares, it is accordingly necessary for the proportion of the light reflected at the optical faces (in particular at the boundaries of the lens elements) to be kept low. To this end, the lens elements are provided with an “optical coating” in modern lenses, in particular with coatings that reduce reflection. In the case of lens element faces forming a glass-air interface, coatings having a plurality of layers of different materials with correspondingly different refractive indices are typically used. This suppresses or at least largely reduces reflections at said faces, with the result that the highest possible proportion of the incident light is actually transmitted (in particular all the way to the image sensor of the relevant camera).

Then again, it is sometimes also of interest to users to include visible reflections in the recording, especially for artistic images, for example to better convey moods, to be able to indicate glaring light and the like. This is an area of conflict with the light intensity because the transmission should be as high as possible even in that case.

In conventional camera systems, this can be solved by virtue of using different lenses for recordings, for example by virtue of using a lens subject to less surface treatment for a recording in which lens flares are explicitly desired. However, mobile terminals, smartphones in particular, are increasingly entering the market and experiencing continual improvement in the field of photography, be it through improved optical units and/or through image sensors with an increasing pixel density. However, interchangeable optical units are undesirable and/or not provided for from a technical point of view on account of the required compactness in this field. Thus, the optical units used in this case are usually configured to suppress regularly unwanted effects.

SUMMARY

It is an object of the disclosure to create artistically appealing recordings even with a mobile terminal.

The object is achieved by a method for operating an image recording system including a mobile terminal, an image recording system including a mobile terminal, and a non-transitory computer-readable storage medium with a computer program, as described herein.

The method according to an aspect of the disclosure serves to operate an image recording system including a mobile terminal (for example a smartphone), in turn including an image recording device. In this case, the image recording device typically includes at least an image sensor and an optical unit assigned thereto. Within the scope of the method according to an aspect of the disclosure, at least one recording of a scene is captured initially (with the image recording device in particular). This recording or at least one of the optionally several recordings is subsequently checked for the presence of a light source. Moreover—provided a light source is present—a position of the light source is determined relative to an optical center. Further, a shape (of the light source), an intensity and/or a color is determined for the light source. Moreover, an algorithm trained in relation to imaging properties of a given optical unit (thus an algorithm forming an “artificial intelligence”, “AI” or else “machine learning algorithm” in particular) is used to generate an (in particular artificial) flare image of a lens flare (also: “ghost”) for this light source using the position of the light source. This flare image is combined (subsequently combined in particular) with the recording to form a combination image and the combination image is stored in a memory component (and optionally additionally displayed on a display apparatus as well, in particular of the mobile terminal).

Here and hereinbelow, the term “optical center” is understood to mean, in particular, the center of the recording or the optical (center) axis of the optical unit. However, the two features typically effectively coincide, which is to say the optical axis is incident on the image sensor at the center of the recording. In this case, the position of the light source typically reproduces, indirectly or directly, at least the distance of the light source (parallel to the surface of the image sensor) from the optical center. Typically—in the case of a rotationally symmetric optical unit—the position is specified by a radius and an assigned angle with respect to the optical center. In the case of a non-rotationally symmetric optical unit, for example because at least one optical element (e.g., a lens element, a mirror, or the like) has a free-form surface and/or an anamorphic design, the position is by contrast described in Cartesian coordinates.

Expressed in simple terms, the disclosure thus follows the approach of creating the flare image with artificial intelligence (i.e., the aforementioned trained algorithm). This is advantageous in that a comparatively time-saving creation of the flare image is made possible as a result. A usually complicated and time-consuming simulation of the flare image with “ray tracing” methods known per se can thus be avoided. This is based on the fact that such trained algorithms are not directed to the calculation of the specific solution per se, but to finding a solution which is either already known from the learnt wealth of experience or which can be derived comparatively easily therefrom. This in turn allows an image containing one or more lens flares to be created virtually in real time or at least with a short delay (e.g., within less than 30 seconds, which in turn depends on a computing power of the mobile terminal but nevertheless is much faster than in the case of a conventional calculation with ray tracing) for optical units configured per se for the avoidance of such effects.

Thus, the operating method serves for image processing in particular.

To combine the flare image with the recording, the flare image is typically placed over the recording, for example added to the latter, or fused with the latter, for example with what is known as multiscale fusion.

In an optional method variant, a separate flare image with an assigned lens flare is created for each individual light source and combined with the recording in accordance with the procedure described herein and hereinbelow. Alternatively, the corresponding lens flares for a plurality of light sources are generated or combined in only one flare image.

In a particularly advantageous method variant, the flare image is oriented vis-à-vis the recording before being combined with the recording. In particular, the flare image is rotated in such a way to this end that the flare image, in detail the specific lens flare, is aligned with a theoretical position of precisely this lens flare in the recording. This is especially advantageous in the case of a rotationally symmetric optical unit since, for determining the lens flare (in particular the shape or nature thereof), only the distance thereof from the optical center (regularly corresponding to the rotational center of the optical unit) is sufficient in this case. The subsequent rotation of the assigned flare image described here and serving to determine the lens flare therefore allows computing time to be saved within the scope of determining the lens flare. However, in principle, it is also possible to determine the “final” flare image (oriented to the position of the light source) based on the distance (radius) and angle with respect to the center or on the basis of Cartesian coordinates.

In a further advantageous method variant, the flare image is convolved with the (in particular determined) shape of the light source (optionally also with an intensity image containing the shape thereof) before being combined with the recording. This is advantageous to the effect of the lens flare in the flare image being created with a punctiform light source as a starting point. As a result of the convolution, the lens flare can then be “adapted” to the extent and shape of the light source (specified in pixels, in particular), typically provided with a corresponding blur (“smeared”). As a result, a comparatively realistic combination image is made possible. Thus, the flare image would be convolved with a round disk in the case of the sun, and with a rectangle in the case of an (in particular outshone) television set. Optionally, the intensity distribution of the light source (via its shape) can also be used in this case, especially in color-resolved fashion, for the convolution with the flare image. However, since the image of the light source (in particular the aforementioned intensity image thereof) in this case already has a sufficiently high similarity, it is also possible to dispense with this measure such that high-quality results that are qualitatively sufficient from a subjective point of view can nevertheless be obtained while computing time (and/or computing power) is saved.

In order to adapt the lens flare to the color of the light source, at least one color filter, which contains the color and in particular also the intensity of the light source, is applied within the scope of the above-described convolution according to an advantageous method variant in particular. Expressed differently, such a color filter is integrated into the convolution. The color of a lens flare depends on the spectrum of the light source (and also on antireflection coatings and/or materials of the optical unit) and can therefore be weighted with the color determined for the light source. Advantageously, this leads to a display of the lens flare that is as realistic as possible. To this end, the intensity values of the respective color channels of the recording of the light source are considered in weighted fashion within the scope of the convolution of the lens flare with the intensity image of the light source. For example, what is known as a filter kernel, which is weighted dependent on the intensity value of the color channels, is used to this end within the scope of the convolution.

To provide the largest possible amount of flexibility—especially also from an artistic point of view—an optical unit that differs from the optical unit for the recording which is to be combined with the flare image (i.e., differs from the corresponding optical unit of the image recording device) is used as the given optical unit in an optional method variant. For example, a lens flare which in terms of its characteristics would originate from a cinematic or other lens (e.g., a professional lens), for example, can be “placed” over a recording captured by the mobile terminal (e.g., a smartphone or tablet). As a result, recordings from comparatively simple terminals can thus be provided with seemingly professional effects, the lens flares in this case.

By way of example, the optical unit for creating the lens flare may be fixedly specified, for example as the aforementioned cinematic optical unit. However, a user of the image recording system, of the mobile terminal, is advantageously offered (correspondingly before the lens flare is created) a selection of (a plurality of) different optical units for which the respective lens flare should be created. The user then selects the desired optical unit as the given optical unit therefrom. For example, this selection also includes (especially in addition to the aforementioned cinematic optical unit; optionally also other professional optical units) the optical unit actually used, which is to say the optical unit used for the recording to be combined with the flare image. Thus, in this variant, the user can specifically specify the optical unit for which the lens flare should be created.

Here and hereinbelow, "cinematic" or "professional" optical units or lenses should be understood to mean those optical units which, on account of their optical properties, lens coatings and/or low manufacturing tolerances, are usually only used in cinematography or professional photography (especially since these are often not available to, or in an unprofitable price bracket for, regular consumers).

In an advantageous method variant, the color channels of the recording and/or of the combination image are corrected in accordance with a transmission curve of the given optical unit or of the optical unit of the image recording device, before or after the flare image was combined with the recording. For the case that a different optical unit to the one for the recording to be combined with the flare image to create the lens flare is used as given optical unit, the recording is advantageously adapted to the transmission curve of the given optical unit to adapt the possibly different color spectra of the emerging from the different optical units. For example, in the case where the aforementioned cinematic lens should be used as given optical unit, the recording created using the smartphone, for example, can thus be adapted to the transmission curve of the cinematic lens, with the result that the overall impression of recording and added lens flare "fits" in respect of the spectra thereof. However, it is also possible to initially correct the "original" recording based on the transmission curve of the "own" optical unit, to reduce image errors that may have occurred.

In a typical method variant, the position, the shape, the intensity or the color of the light source is determined by segmenting the corresponding recording. Typically, the presence of the light source per se is also checked (or: analyzed) with segmentation.

In a particularly advantageous method variant, at least the intensity (in particular the absolute intensity) of the light source, but optionally also the position, the shape and/or the color of the light source, is determined on the basis of a recording ("overview recording") that differs from the recording to be combined with the flare image, in particular a recording captured with an additional image sensor with a correspondingly assigned additional optical unit, the said overview recording having a greater dynamic range than the recording to be combined. Expressed differently, at least two recordings are created (especially in parallel), wherein one of the two recordings contains the actual image information, and the other recording serves as a source of information about the light source. For the latter recording (i.e., the overview recording), use is made of an ISO number that is as small as possible and/or a short exposure time in order to obtain a dynamic range required for the capture of the intensity of the light source that is as complete as possible. This is because what is known as clipping often arises in the case of conventional recording settings (overdriving or overexposing individual picture elements or pixels, which is to say the actual intensity exceeds the intensity detectable by a pixel). Optionally, a neutral-density filter (or comparable transmission-damping filter) can also be used to this end for the additional optical unit. This procedure is advantageous in the case of a smartphone forming the mobile terminal since modern smartphones frequently have a plurality of "cameras" with different optical units, for example wide-angle, telephoto and the like, operating in parallel. Typically, a wide-angle optical unit and an image sensor advantageously configured for corresponding ISO numbers are used for the overview recording. Especially in the case of smartphones, such cameras are also advantageously arranged so close to one another that the offset of the respective optical axes from one another is negligible.

Typically, an optical unit (in particular also an assigned image sensor) is used for the overview recording which has a larger field of view, which is to say a larger FOV, vis-à-vis the optical unit (and in particular the assigned image sensor) for the recording to be combined with the flare image. For example, in the case of the smartphone, this is achieved in particular by the use of the camera with the wide-angle optical unit, as described above. This advantageously additionally also makes it possible to detect light sources located outside of the "actual" recording (i.e., the recording to be combined with the flare image) (i.e., outside of the field of view of said recording) (but within the FOV of the additional optical unit) and use these to generate an appropriate lens flare.

In an optional method variant, this overview recording is created with a separate piece of equipment, for example a camera separate from the mobile terminal. In this case, this camera thus in particular includes the additional optical unit and the additional image sensor. Accordingly, the image recording system in this case advantageously also includes this separate camera in addition to the mobile terminal. Advantageously, the separate camera is data-connected to the mobile terminal, in particular to be able to transmit the overview recording to the mobile terminal and optionally also in order to be able to control, from the mobile terminal, the taking of the overview recording.

In an alternative method variant, however, it is alternatively also possible for only a single image sensor with an assigned optical unit to be used if this image sensor is configured to capture high dynamic range (HDR) recordings.

Further alternatively, albeit linked to larger outlay, the intensity of the light source may however also be at least estimated approximately from the recording (possibly subjected to clipping) by virtue of a halo around an overexposed light source being evaluated in relation to a shape of a point spread function and by virtue of the shape of the light source determined from the segmentation also being evaluated. By way of example, methods known as "inverse tone mapping" are used to this end.

In order to achieve a setting of the lens flare that is as realistic as possible, the intensity thereof is expediently scaled on the basis of the intensity, optionally the absolute intensity, determined for the (correspondingly assigned) light source and typically adapted to this intensity. In particular, the "absolute intensity" should be understood as meaning the plurality of photons detected by the image sensor (especially in the case of so-called photon-counting image sensors).

In a typical method variant, an algorithm trained based on ray tracing or a similar model for the given optical unit or based on real measurements and/or image recordings with the given optical unit is used as trained algorithm in particular. The algorithm is optionally trained for a plurality of optical units such that the above-described user-specific selection of a certain optical unit for example changes a parameter set considered within the scope of the algorithm. Alternatively, a specific algorithm trained according to the explanations given above is used for each optical unit available for selection, the said algorithm being "activated" in the case of the corresponding selection of a lens by the user.

Typically, a convolutional neural network (CNN) is used for the algorithm (or optionally for each algorithm in the case of a plurality of algorithms). Alternatively, a nonlinear regression algorithm, a dictionary learning algorithm, or the like is used.

The image recording system according to an aspect of the disclosure includes the above-described mobile terminal, which in turn, as described above, includes the image recording device. The latter in turn includes the at least one image sensor and the correspondingly assigned optical unit for capturing the aforementioned recording of the scene. The terminal further includes a processor which is configured to perform the above-described method, especially in automated fashion.

The image recording system, in particular the mobile terminal—typically a smartphone—consequently likewise has the above-described physical features, but also the method features. Consequently, the method and the terminal also share the advantages arising from the method steps and the physical features.

The processor typically is, at least essentially, a microprocessor with a memory or non-transitory computer-readable storage medium on which a software application (formed by program code in particular) for performing the above-described method is stored in executable fashion. Thus, the method is performed by the microprocessor upon execution of the software application. In this case, it is further advantageous that modern smartphone processors are frequently already configured for carrying out algorithms from the field of artificial intelligence.

Optionally, the image recording system is formed by the mobile terminal itself. However, for the above-described case of the separate camera for the overview recording, the image recording system may additionally also include this separate camera.

The disclosure moreover relates to a computer program (also referred to as "software program" or "application", "app" for short), which has (contains) commands which, upon execution of the computer program on a processor of the image recording system, in particular on the (aforementioned) processor of the terminal, prompt the latter to carry out the above-described method.

In particular, the conjunction "and/or" should be understood here and hereinbelow as meaning that the features linked with this conjunction may be formed both jointly and also as alternatives to one another.

BRIEF DESCRIPTION OF THE DRAWINGS

The disclosure will now be described with reference to the drawings wherein.

DESCRIPTION OF EXEMPLARY EMBODIMENTS

Parts and dimensions which correspond to one another are denoted by the same reference signs throughout the figures.

Figure 1:
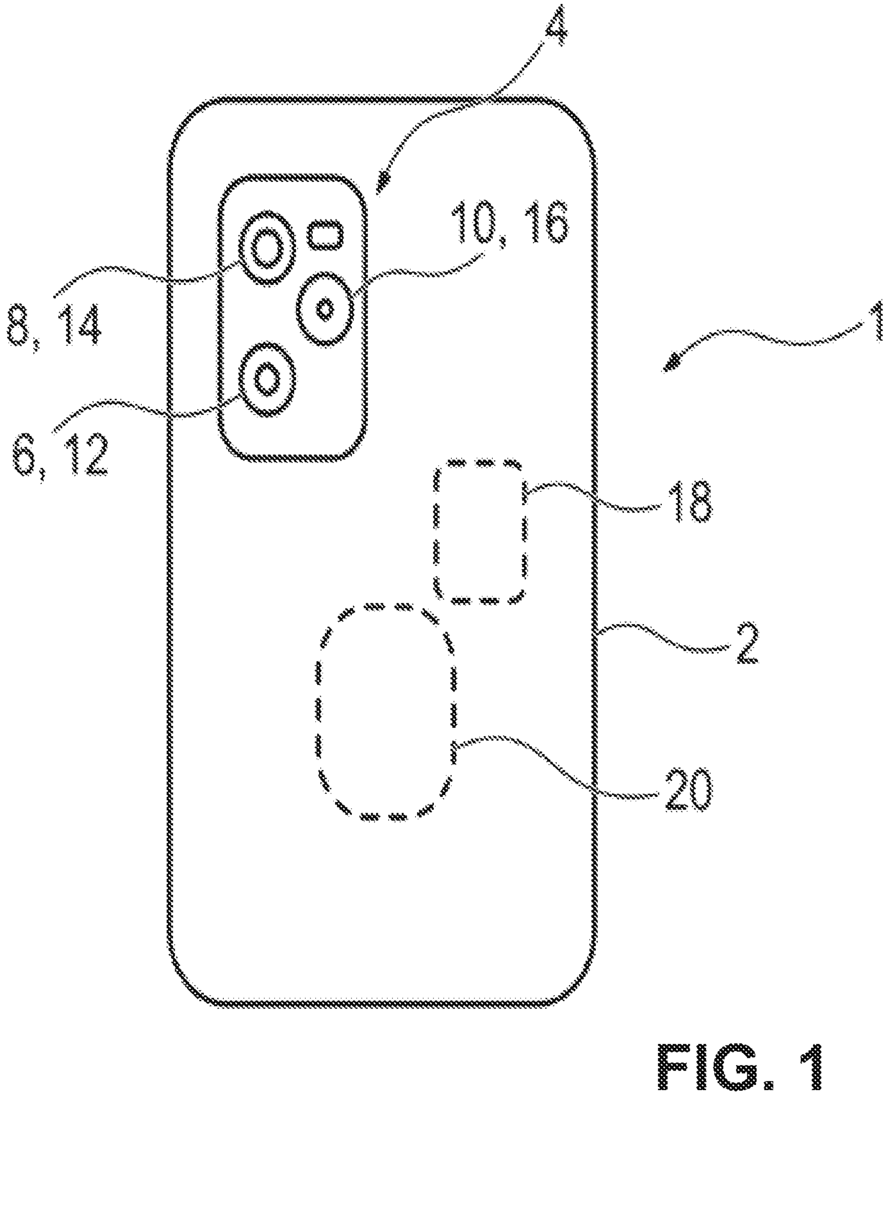
FIG. 1 shows a schematic plan view of a back side of a mobile terminal according to an exemplary embodiment of the disclosure.
Figure 2:
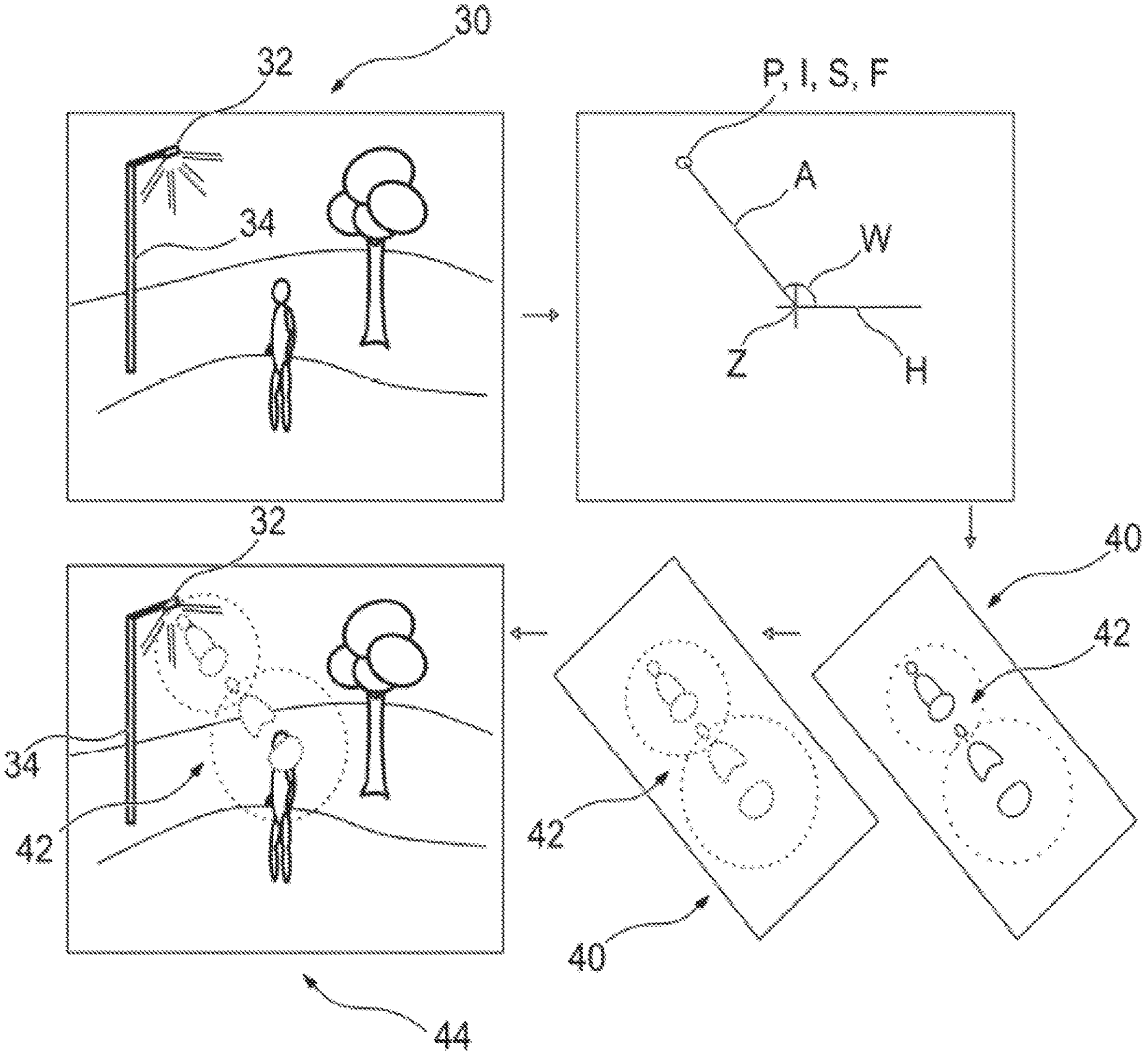
FIG. 2 shows a schematic illustration of an execution of an operating method for the mobile terminal according to an exemplary embodiment of the disclosure.

FIG. 1 schematically illustrates an image recording system including a mobile terminal, specifically a smartphone 1, with a view of the back side thereof. In addition to the usual components such as a housing 2 and an electronic visual display on the front side not depicted here, etc., the smartphone 1 includes at least one image recording device 4. In the presently considered exemplary embodiment, this image recording device is formed by three individual cameras, specifically a main camera 6, a wide-angle camera 8 and a telephoto camera 10. Each of these cameras includes an image sensor not depicted in detail and an optical unit (lens) 12, 14, and 16, respectively, which enables the corresponding function (e.g., wide-angle recordings) in conjunction with the respective image sensor. The smartphone 1 also includes a processor 18. A software program is stored in executable fashion on a memory 20 assigned to the processor 18 and execution of said software program during operation causes the processor 18 to perform an operating method described in more detail below.

The optical units 12, 14, and 16 of the smartphone 1 have been provided with coatings, which is to say with antireflection coatings, such that reflections at the respective lens element surfaces are suppressed or at least reduced, in order to keep the transmission at each optical unit 12, 14, and 16 as high as possible. This suppresses lens flares, which are also referred to as ghosts or the like, or reduces these to a negligible amount since these are perceived as bothersome in many image recordings. However, such lens flares are desirable, especially in artistic image recordings, to be able to highlight or emphasize certain picture elements. For example, a conventional camera cannot image the natural dynamic range; bright light sources lead to an overexposure of individual sensor pixels and are reduced in terms of their dynamic range on account of clipping. To artistically highlight the brightness of a light source, use is frequently made of the effect of the aforementioned lens flares as these can illustrate a type of dazzling effect. To this end, a different lens with no or only little optical coating, for example, can be used in the case of conventional single-lens reflex cameras. However, this is not possible in the case of a smartphone like the one illustrated. It is for this reason that the smartphone 1 is configured with the software program to artificially generate lens flares for an image recording.

Figure 3:
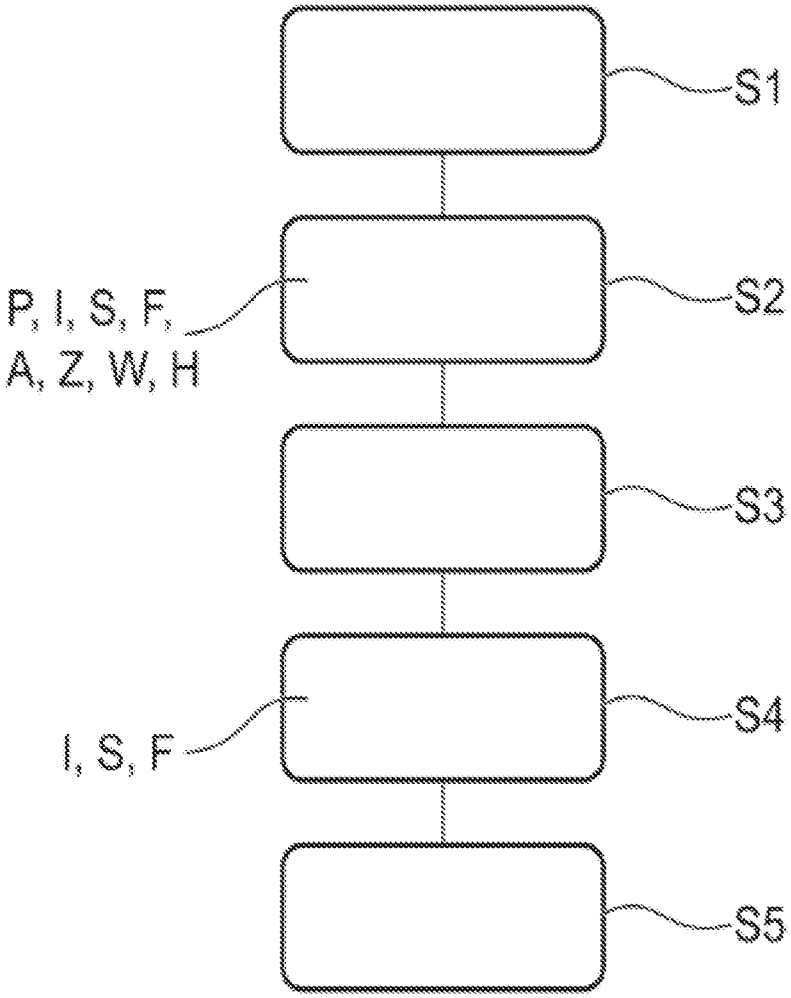
FIG. 3 shows a schematic flow chart of the operating method according to an exemplary embodiment of the disclosure.

To this end, a (main) recording 30 is captured by the main camera 6 in accordance with a first method step S1 (see FIG. 3). In the present exemplary embodiment, an overview recording (not shown here) of the same scene and with the same image dimensions as the recording 30, but with the smallest possible ISO number, is at least also captured at the same time with one of the other cameras, the wide-angle camera 8 in this case, in order to be able to image the largest possible dynamic range.

According to a second method step S2, a position P of a light source—specifically of an illuminant 32 in a lantern 34 in the recording 30—is detected from the overview recording with segmentation. This position P is described by a distance A from the optical center Z (in this case the center of the recording 30 or the overview recording) and an angle W vis-à-vis a horizontal H. This applies to the rotationally symmetric optical units 12 and 14 used here. Moreover, an intensity I, a shape S and a color F of the light of the illuminant 32 is also determined in the second method step S2 with the segmentation.

Based on the position P of the illuminant 32, a flare image 40 with a lens flare 42 for this light source is created in a third method step S3. To this end, use is made of an algorithm trained based on the imaging properties of a given optical unit, specifically a CNN algorithm in the present exemplary embodiment. In this case, the imaging properties of the given optical unit were learnt by the algorithm with real image recordings by this given optical unit (or at least a structurally identical optical unit) and/or with a property determined with a ray tracing method. In the present exemplary embodiment, a cinematic optical unit, for example, is used as given optical unit. Alternatively, however, the optical unit 12 of the main camera 6 can also be used as given optical unit—for example, in user specifically selectable fashion by way of a menu of the software program. In the case of the option of selecting different optical units, an appropriately trained algorithm is stored in each case and activated in the case of a corresponding selection. After the flare image 40 has been created, the latter is rotated based on the angle W, with the result that a longitudinal axis of the lens flare 42 corresponds to the orientation of the light source vis-à-vis the center Z.

In a fourth method step S4, the flare image 40 is convolved with the shape S of the light source. As a result, the lens flare 42 is adapted to the extent and the shape S of the light source, which is expressed inter alia in a certain reduction in the sharpness of the lens flare 42. However, a color filter is also applied to the lens flare 42 within the scope of this convolution to match the colors of the lens flare 42 to the spectrum of the light source.

In a subsequent, fifth method step S5, the flare image 40 processed thus is combined with the recording 30 to make a combination image 44. To this end, the flare image 40 is for example placed into an assigned image plane prior to the recording or added to the recording 30. The combination image 44 is subsequently stored in the memory 20 and displayed on the electronic visual display of the smartphone 1.

Optionally, the color channels of the recording 30 are still adapted to the transmission curve of the given optical unit prior to the combination to form the combination image 44, such that the lens flare 42 does not stand out in the combination image 44 as subjectively unexpected on account of its coloring.

The subject matter of the disclosure is not restricted to the exemplary embodiment described hereinabove. Rather, further embodiments of the disclosure can be derived by a person skilled in the art from the description hereinabove.

The advantage of the above-described procedure can be found, inter alia, in the fact that, if the position of the light source is known, the remaining parameters (in particular the color of the light source, shape, etc.) for describing the lens flare are describable or ascertainable comparatively easily. Hence, the position of the light source is enough to use the AI to create the flare image. All further operations (rotation, convolution, etc.) are comparatively simple.

LIST OF REFERENCE NUMERALS

1 Smartphone
2 Housing
4 Image recording device
6 Main camera
8 Wide-angle camera
10 Telephoto camera
12 Optical unit
14 Optical unit
16 Optical unit
18 Processor
20 Memory
30 Main recording
32 Illuminant
34 Lantern
40 Flare image
42 Lens flare
44 Combination image
S1, S2 Method step
P Position
A Distance
Z Centre
W Angle
H Horizontal
I Intensity
S Shape
F Color
S3, S4, S5 Method step

What is claimed is:

1. A method for operating an image recording system, the image recording system including a mobile terminal with an image recording device, the image recording device having at least one optical unit and at least one image sensor, the method comprising:
capturing at least one recording of a scene with the at least one optical unit and the at least one image sensor;
checking at least one of the at least one recording of the scene for a presence of a light source;
determining a position of the light source relative to an optical center;
determining at least one of a shape, an intensity, and a color for the light source;
generating an artificial flare image of a lens flare for the light source and a given optical unit based on the position of the light source with a trained algorithm trained on imaging properties of the given optical unit;
combining the artificial flare image with the at least one recording of the scene to form a combination image; and
storing the combination image in a memory,
wherein the given optical unit is an optical unit which is different from any of the at least one optical unit of the image recording device.

2. The method according to claim 1,
wherein the artificial flare image is oriented vis-à-vis the at least one recording before being combined with the at least one recording, and
wherein the artificial flare image is rotated such that the artificial flare image is aligned with a theoretical position of the lens flare in the at least one recording.

3. The method according to claim 1, further comprising:
convoluting the artificial flare image with the shape of the light source before being combined with the at least one recording.

4. The method according to claim 3,
wherein convoluting the artificial flare image with the shape of the light source includes applying at least one color filter containing the color and the intensity of the light source.

5. The method according to claim 1, further comprising:
providing a plurality of different optical units to a user of the image recording system such that the user can select the given optical unit.

6. The method according to claim 1, further comprising:
correcting color channels of the at least one recording or of the combination image in accordance with a transmission curve of at least one of the given optical unit, unit and an optical unit of the at least one optical unit of the image recording device.

7. The method according to claim 1,
wherein at least one of the position, the shape, the intensity, and the color of the light source is determined with segmentation.

8. The method according to claim 1,
wherein at least one of the intensity, the position, the shape, and the color of the light source, is determined based on a recording of the scene captured by an additional one of the at least one optical unit and an additional one of the at least one image sensor which differs from the at least one recording to be combined with the artificial flare image, and which has a larger dynamic range than the at least one recording to be combined.

9. The method according to claim 8, wherein the recording of the scene with the larger dynamic range is made with the additional one of the at least one image sensor and the additional one of the at least one optical unit, which are separate from the at least one image sensor and the at least one optical unit for capturing the at least one recording to be combined with the artificial flare image, and wherein the additional one of the at least one optical unit has a larger field of view vis-à-vis the at least one optical unit for capturing the at least one recording to be combined with the artificial flare image.

10. The method according to claim 1, wherein a flare intensity for the artificial flare image is scaled based on the intensity or an absolute intensity of the light source.

11. The method according to claim 1, wherein the trained algorithm is at least one of an algorithm trained based on (1) a ray tracing model for the given optical unit or based on real measurements, and (2) image recordings by the given optical unit.

12. The method according to claim 1, wherein the trained algorithm is at least one of (1) a convolutional neural network, (2) a nonlinear regression algorithm, and (3) a dictionary learning algorithm.

13. An image recording system, comprising:

a mobile terminal including an image recording device and a processor, wherein the image recording device comprises at least one image sensor and at least one optical unit assigned to the at least one image sensor and configured to capture a recording of a scene, and wherein the processor is configured to:

capture at least one recording of the scene with the at least one optical unit and the at least one image sensor;

check at least one of the at least one recording of the scene for a presence of a light source;

determine a position of the light source relative to an optical center;

determine at least one of a shape, an intensity, and a color for the light source;

generate an artificial flare image of a lens flare for the light source and a given optical unit based on the position of the light source with a trained algorithm trained on imaging properties of the given optical unit;

combine the artificial flare image with the at least one recording of the scene to form a combination image; and store the combination image in a memory, wherein the given optical unit is an optical unit which is different from any of the at least one optical unit of the image recording device.

14. A non-transitory computer-readable storage medium encoded with a computer program comprising computer executable commands which when executed on a processor of an image recording system, the image recording system including an image recording device, the image recording device having at least one optical unit and at least one image sensor, cause the processor to:

capture at least one recording of a scene with one of the at least one image sensor and one of the at least one optical unit;

check at least one of the at least one recording of the scene for a presence of a light source;

determine a position of the light source relative to an optical center;

determine at least one of a shape, an intensity, and a color for the light source;

generate an artificial flare image of a lens flare for the light source and a given optical unit based on the position of the light source with a trained algorithm trained on imaging properties of the given optical unit based;

combine the artificial flare image with the at least one recording of the scene to form a combination image; and store the combination image in a memory, wherein the given optical unit is an optical unit which is different from any of the at least one optical unit of the image recording device.

* * * * *